(12) United States Patent
Katsumata et al.

(10) Patent No.: US 8,823,862 B2
(45) Date of Patent: Sep. 2, 2014

(54) POSITION DETECTION DEVICE, POSITION DETECTION METHOD, AND IMAGING APPARATUS

(75) Inventors: Soichiro Katsumata, Tokyo (JP); Naoyuki Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 119 days.

(21) Appl. No.: 13/566,728

(22) Filed: Aug. 3, 2012

(65) Prior Publication Data

US 2013/0050558 A1 Feb. 28, 2013

(30) Foreign Application Priority Data

Aug. 22, 2011 (JP) ................. 2011-180876

(51) Int. Cl.
| | |
|---|---|
| *H04N 5/262* | (2006.01) |
| *H04N 5/232* | (2006.01) |
| *H04N 5/225* | (2006.01) |
| *G01D 5/244* | (2006.01) |
| *G02B 7/10* | (2006.01) |
| *G01D 1/00* | (2006.01) |

(52) U.S. Cl.
CPC .... *G01D 5/24485* (2013.01); *G03B 2205/0046* (2013.01); *H04N 5/225* (2013.01); *G02B 7/10* (2013.01); *G01D 1/00* (2013.01)
USPC ...................................... 348/345; 348/240.3

(58) Field of Classification Search
CPC ........... H04N 5/23212; H04N 5/23296; G02B 15/14; G02B 13/009; G02B 7/09; G03B 13/36; G03B 3/10; G03B 2205/0046; G03B 2205/0053; G03B 5/00
USPC .............. 348/240.99, 240.1, 240.3, 345, 347, 348/357; 396/85, 87, 133; 359/394, 359/696–701
See application file for complete search history.

(56) References Cited

U.S. PATENT DOCUMENTS

2008/0117534 A1* 5/2008 Onuki et al. .................. 359/824

FOREIGN PATENT DOCUMENTS

| JP | 2006-258586 | | 9/2006 |
|---|---|---|---|
| JP | 2006258586 A | * | 9/2006 |

* cited by examiner

*Primary Examiner* — Timothy J Henn
(74) *Attorney, Agent, or Firm* — Rader, Fishman & Grauer PLLC (57) ABSTRACT

There is provided a position detection device including a first detection sensor that operates in a predetermined direction, outputs a continuously increasing or decreasing signal, and detects an absolute position of a movable lens moved in an optical axis direction, and a second detection sensor that operates in the predetermined direction, outputs a periodically and continuously changing signal, and detects a relative position of the movable lens. The first detection sensor and the second detection sensor operate at different operation speeds.

20 Claims, 8 Drawing Sheets

FIG. 1

50 ⋯ IMAGING APPARATUS

FIG. 3

57 ··· CAM RING
63 ··· FIRST CAM GROOVE
64 ··· SECOND CAM GROOVE
1 ··· FIRST DETECTION SENSOR
2 ··· SECOND DETECTION SENSOR

FIG. 5

57B ··· CAM RING
63B ··· FIRST CAM GROOVE
64B ··· SECOND CAM GROOVE

FIG. 6

57B ··· CAM RING
63B ··· FIRST CAM GROOVE
64B ··· SECOND CAM GROOVE

5 ⋯ FIRST DETECTION SENSOR
6 ⋯ SECOND DETECTION SENSOR
57D ⋯ CAM RING

FIG. 9

POSITION DETECTION DEVICE, POSITION DETECTION METHOD, AND IMAGING APPARATUS

BACKGROUND

The present technology relates to a position detection device, a position detection method, and an imaging apparatus, and more particularly, to a position detection device, a position detection method, and an imaging apparatus capable of detecting a position of a movable lens with high resolution and high accuracy by configuring the operation speed of a first detection sensor detecting an absolute position of the movable lens to be different from the operation speed of a second detection sensor detecting a relative position of the movable lens.

Various imaging apparatuses such as still cameras and video cameras are configured such that the position of a movable lens, such as a zoom lens, moved in an optical axis direction is detected and the driving of a lens group including the movable lens is controlled with high accuracy.

An example of the movable lens also includes a focus lens that has a focusing function. The focus lens has not only the function of focusing the image of a subject on an image sensor but also the function of a compensator that corrects a variation in an image surface when the zoom lens is moved.

In an imaging apparatus including an interchangeable lens that is detachably mounted on an apparatus body, a zoom ring is provided so that a manual operation can be performed on the interchangeable lens. When the zoom ring is rotated, the zoom lens is moved in an optical axis direction to perform a power changing operation.

As described above, the position of each movable lens in the optical axis direction is detected by a position detection device. The position detection device includes a first detection sensor that detects an absolute position of a movable lens and a second detection sensor that detects a relative position of the movable lens (for example, see Japanese Unexamined Patent Application Publication No. 2006-258586).

In an imaging apparatus disclosed in Japanese Unexamined Patent Application Publication No. 2006-258586, a potentiometer that outputs a linear signal and has low accuracy is used as the first detection sensor and a magneto-resistive (MR) sensor that outputs a periodic signal and has high accuracy is used as the second detection sensor in order to detect the position of the zoom lens that is moved in the optical axis direction via a connection mechanism in response to the rotation of the zoom ring.

SUMMARY

In the position detection device detecting the position of the movable lens using two sensors detects the position of the movable lens with high resolution and high accuracy, in order to detect the position of the movable lens with high resolution and high accuracy, it is necessary for the first detection sensor having low detection accuracy to match a periodic signal of the second detection sensor having high detection accuracy. Accordingly, one period of an output signal of the second detection sensor outputting a periodic signal is necessarily greater than a detection error of the first detection sensor outputting a linear signal.

Accordingly, in a position detection device of an imaging apparatus according to the related art, one period of the output signal of the second detection sensor is set to be greater than the detection error of the first detection sensor by enlarging a magnetization pitch of the MR sensor used as the second detection sensor.

The position of the movable lens can be detected with high resolution and high accuracy by enlarging the magnetization pitch of the MR sensor. However, when the magnetization pitch of the MR sensor is enlarged, an operation range of the second detection sensor may increase accordingly. Then, there is a problem that miniaturization may not be achieved or cost may increase.

For example, a potentiometer having a small linearity error or small hysteresis is used as the first detection sensor having a small detection error and high accuracy in some cases so that the first detection sensor matches the periodic signal of the second detection sensor. In these cases, however, there is a problem that the first detection sensor may become expensive and thus the cost may increase.

It is desirable to provide a position detection device, a position detection method, and an imaging apparatus capable of detecting the position of a movable lens with high resolution and high accuracy to achieve miniaturization and decrease manufacturing cost.

According to an embodiment of the present technology, there is provided a position detection device including: a first detection sensor that operates in a predetermined direction, outputs a continuously increasing or decreasing signal, and detects an absolute position of a movable lens moved in an optical axis direction; and a second detection sensor that operates in the predetermined direction, outputs a periodically and continuously changing signal, and detects a relative position of the movable lens. The first and second detection sensors operate at different operation speeds.

Accordingly, in the position detection device, the first and second detection sensors operate at the different speeds.

In the position detection device according to the embodiment of the present technology, one period of the output signal of the second detection sensor may be equal to or greater than a detection error of the first detection sensor.

Since one period of the output signal of the second detection sensor is equal to or greater than the detection error of the first detection sensor, the operation speed of the second detection sensor is slower than the operation speed of the first detection sensor.

In the position detection device according to the embodiment of the present technology, a range in which the operation speeds of the first and second detection sensors are different from each other may be set to be a part of each operation range of the first and second detection sensors.

Since the range in which the operation speeds of the first and second detection sensors are different from each other is set to be a part of each operation range of the first and second detection sensors, a degree of sensitivity, which is detection accuracy according to sensitivity, can be adjusted.

In the position detection device according to the embodiment of the present technology, the first and second detection sensors may operate in a straight line.

Since the first and second detection sensors operate in a straight line, a detection operation can be simplified.

The position detection device according to the embodiment of the present technology may further include a cam ring that includes first and second cam portions and rotates in an axis rotation direction. The first detection sensor may slidably engage with the first cam portion. The second detection sensor may slidably engage with the second cam portion. The movable lens may be moved in the optical axis direction in response to the rotation of the cam ring. When an engagement position of the first detection sensor with respect to the first cam portion is changed and an engagement position of the second detection sensor with respect to the second cam portion is changed depending on a rotation position of the cam ring, the first and second detection sensors may operate in the straight line.

Since the movable lens is moved in the optical axis direction in response to the rotation of the cam ring and the first and second detection sensors operate in the straight line, the first and second detection sensors can be moved together with the movable lens in the optical axis direction.

In the position detection device according to the embodiment of the present technology, the operation speeds of the first and second detection sensors may be configured to be different from each other by setting inclinations of the first and second cam portions to be different from each other.

Since the operation speeds of the first and second detection sensors are configured to be different from each other by setting the inclinations of the first and second cam portions to be different from each other, the configuration can be simplified.

In the position detection device according to the embodiment of the present technology, the first and second detection sensors may be configured to operate rotatably.

Since the first and second detection sensors are configured to operate rotatably, the detection operation can be simplified.

The position detection device according to the embodiment of the present technology may further include a cam ring that includes a rack portion on an outer circumferential surface thereof and rotates in an axis rotation direction. The first detection sensor may include a gear portion meshing with the rack portion. The second detection sensor may include a gear portion meshing with the rack portion and having an outer diameter different from an outer diameter of the gear portion of the first detection sensor. The movable lens may be moved in the optical axis direction in response to the rotation of the cam ring. The gear portion of the first detection sensor and the gear portion of the second detection sensor may be rotated with the rotation of the cam ring.

Since the movable lens is moved in the optical axis direction by the rotation of the cam ring and the gear portions of the first and second detection sensors are rotated with the rotation of the cam ring, the first and second detection sensors can be rotated with the movement of the movable lens in the optical axis direction.

In the position detection device according to the embodiment of the present technology, sizes of the outer diameters of the gear portions of the first and second detection sensors may be configured to be different from each other so that the operation speeds of the first and second detection sensors are different from each other.

Since the sizes of the outer diameters of the gear portions of the first and second detection sensors are configured to be different from each other so that the operation speeds of the first and second detection sensors are different from each other, the configuration can be simplified.

According to another embodiment of the present technology, there is provided a position detection method including: operating a first detection sensor, which operates in a predetermined direction and outputs a continuously increasing or decreasing signal, and a second detection sensor, which operates in the predetermined direction and outputs a periodically and continuously changing signal, at different operation speeds; detecting an absolute position of a movable lens moved in an optical axis direction by the first detection sensor and detecting a relative position of the movable lens by the second detection sensor; and detecting a position of the movable lens based on the absolute position of the movable lens detected by the first detection sensor and the relative position of the movable lens detected by the second detection sensor.

According to the position detection method, the first and second detection sensors operate at the different speeds.

According to still another embodiment of the present technology, there is provided an imaging apparatus including: a movable lens that is moved in an optical axis direction; an image sensor that converts an optical image formed by a plurality of lenses including the movable lens into an electric signal; a first detection sensor that operates in a predetermined direction, outputs a continuously increasing or decreasing signal, and outputs an absolute position of the movable lens; and a second detection sensor that operates in the predetermined direction, outputs a periodically and continuously changing signal, and detects a relative position of the movable lens. The first and second detection sensors operate at different operation speeds.

Accordingly, in the imaging apparatus, the first and second detection sensors operate at the different speeds.

In the embodiment of the present technology, a position detection device includes: a first detection sensor that operates in a predetermined direction, outputs a continuously increasing or decreasing signal, and detects an absolute position of a movable lens moved in an optical axis direction; and a second detection sensor that operates in the predetermined direction, outputs a periodically and continuously changing signal, and detects a relative position of the movable lens. The first and second detection sensors operate at different operation speeds.

Accordingly, in the position detection device of the present technology, the position of the movable lens can be detected with high resolution and high accuracy, while achieving miniaturization and reducing manufacturing cost.

In the embodiment of the present technology, one period of an output signal of the second detection sensor is equal to or greater than a detection error of the first detection sensor.

Accordingly, since a periodic output of the second detection sensor having high detection accuracy is configured to be matched by the first detection sensor having low detection accuracy, the position of the movable lens can be detected with high resolution and high accuracy.

In the embodiment of the present technology, the range in which the operation speeds of the first and second detection sensors are different from each other is set to be a part of each operation range of the first and second detection sensors.

Accordingly, when the degree of sensitivity, which is the detection accuracy according to the sensitivity, is adjusted, the detection ranges of the first detection sensor and the second detection sensor can be used effectively. Therefore, the first and second detection sensors can be miniaturized and sensors having low detection accuracy can be used as the first and second detection sensors.

In the embodiment of the present technology, the first and second detection sensors operate in a straight line.

Accordingly, the position of the movable lens can be detected with high resolution and high accuracy, while simplifying the detection operation and reducing manufacturing cost.

In the embodiment of the present technology, the position detection device further includes a cam ring that includes first and second cam portions and rotates in an axis rotation direction. The first detection sensor slidably engages with the first cam portion. The second detection sensor slidably engages with the second cam portion. The movable lens is moved in the optical axis direction in response to the rotation of the cam ring. When an engagement position of the first detection sensor with respect to the first cam portion is changed and an engagement position of the second detection sensor with respect to the second cam portion is changed depending on a rotation position of the cam ring, the first and second detection sensors operate in the straight line.

Accordingly, since the first and second detection sensors are moved together with the movable lens in the optical axis direction, the detection operation can be controlled with ease. Further, the position of the movable lens can be detected with high resolution and high accuracy, while reducing the manufacturing cost.

In the embodiment of the present technology, the operation speeds of the first and second detection sensors are configured to be different from each other by setting inclinations of the first and second cam portions to be different from each other.

Accordingly, the position of the movable lens can be detected with high resolution and high accuracy, while having a simple configuration and reducing the manufacturing cost.

In the embodiment of the present technology, the first and second detection sensors are configured to operate rotatably.

Accordingly, the position of the movable lens can be detected with high resolution and high accuracy, while simplifying the detection operation and reducing the manufacturing cost.

In the embodiment of the present technology, the position detection device further includes a cam ring that includes a rack portion on an outer circumferential surface thereof and rotates in an axis rotation direction. The first detection sensor includes a gear portion meshing with the rack portion. The second detection sensor includes a gear portion meshing with the rack portion and having an outer diameter different from an outer diameter of the gear portion of the first detection sensor. The movable lens is moved in the optical axis direction in response to the rotation of the cam ring. The gear portions of the first and second detection sensors are rotated with the rotation of the cam ring.

Accordingly, since the first and second detection sensors are moved together with the movable lens in the optical axis direction, the detection operation can be controlled with ease. Further, the position of the movable lens can be detected with high resolution and high accuracy, while reducing the manufacturing cost.

In the embodiment of the present technology, the sizes of the outer diameters of the gear portions of the first and second detection sensors are configured to be different from each other so that the operation speeds of the first and second detection sensors are different from each other.

Accordingly, the position of the movable lens can be detected with high resolution and high accuracy, while simplifying the configuration of the position detection device and reducing the manufacturing cost.

In the embodiment of the present technology, a position detection method includes: operating a first detection sensor, which operates in a predetermined direction and outputs a continuously increasing or decreasing signal, and a second detection sensor, which operates in the predetermined direction and outputs a periodically and continuously changing signal, at different operation speeds; detecting an absolute position of a movable lens moved in an optical axis direction by the first detection sensor and detecting a relative position of the movable lens by the second detection sensor; and detecting a position of the movable lens based on the absolute position of the movable lens detected by the first detection sensor and the relative position of the movable lens detected by the second detection sensor.

In the position detection method according to the embodiment of the present technology, the position of the movable lens can be detected with high resolution and high accuracy, while achieving miniaturization and reducing the manufacturing cost.

In the embodiment of the present technology, an imaging apparatus includes: a movable lens that is moved in an optical axis direction; an image sensor that converts an optical image formed by a plurality of lenses including the movable lens into an electric signal; a first detection sensor that operates in a predetermined direction, outputs a continuously increasing or decreasing signal, and outputs an absolute position of the movable lens; and a second detection sensor that operates in the predetermined direction, outputs a periodically and continuously changing signal, and detects a relative position of the movable lens. The first and second detection sensors operate at different operation speeds.

Accordingly, in the imaging apparatus of the present technology, the position of the movable lens can be detected with high resolution and high accuracy, while achieving miniaturization and reducing the manufacturing cost.

BRIEF DESCRIPTION OF THE DRAWINGS

FIG. 7 is a schematic perspective view illustrating another example of a position detection sensor or the like;

FIG. 8 is a schematic perspective view illustrating still another example of a position detection sensor or the like.

DETAILED DESCRIPTION OF THE EMBODIMENTS

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, a preferred embodiment of the present technology will be described with reference to the appended drawings.

In the preferred embodiment to be described below, an imaging apparatus according to an embodiment of the present technology is applied to a still camera, a position detection device according to the embodiment of the present technology is applied to a position detection device installed in the still camera, and a position detection method according to the embodiment of the present technology is applied to a position detection method of the still camera. The application scope of the embodiment is not limited to the still camera, the position detection device installed in the still camera, and the position detection method in the still camera. The embodiment of the present technology is applicable broadly to video cameras, interchangeable lenses, various imaging apparatuses embedded in other apparatuses, position detection devices installed in the various imaging apparatuses, and position detection methods in the various imaging apparatuses.

In the following description, directions viewed from a photographer during a photographing operation of a still camera are referred to as front, rear, right, and left directions. Accordingly, a subject side is the front side and a photographer side is the rear side.

Further, the following front, rear, right, and left directions are used to facilitate the description, and thus the embodiment of the present technology is not limited by these directions.

Configuration of Imaging Apparatus and the Like

Figure 1:
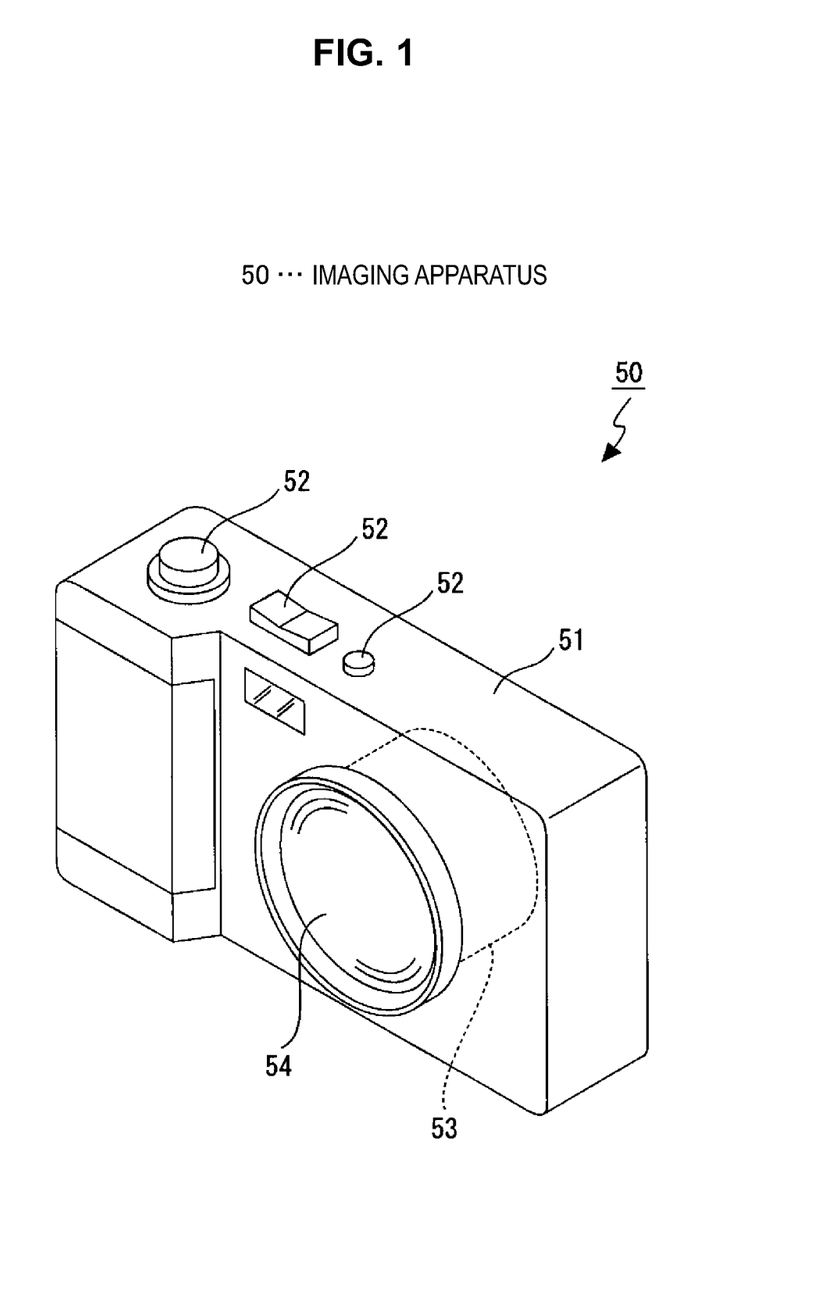
FIG. 1 is a schematic perspective view illustrating an imaging apparatus together with FIGS. 2 to 9 according to a preferred embodiment of the present technology.
Figure 2:
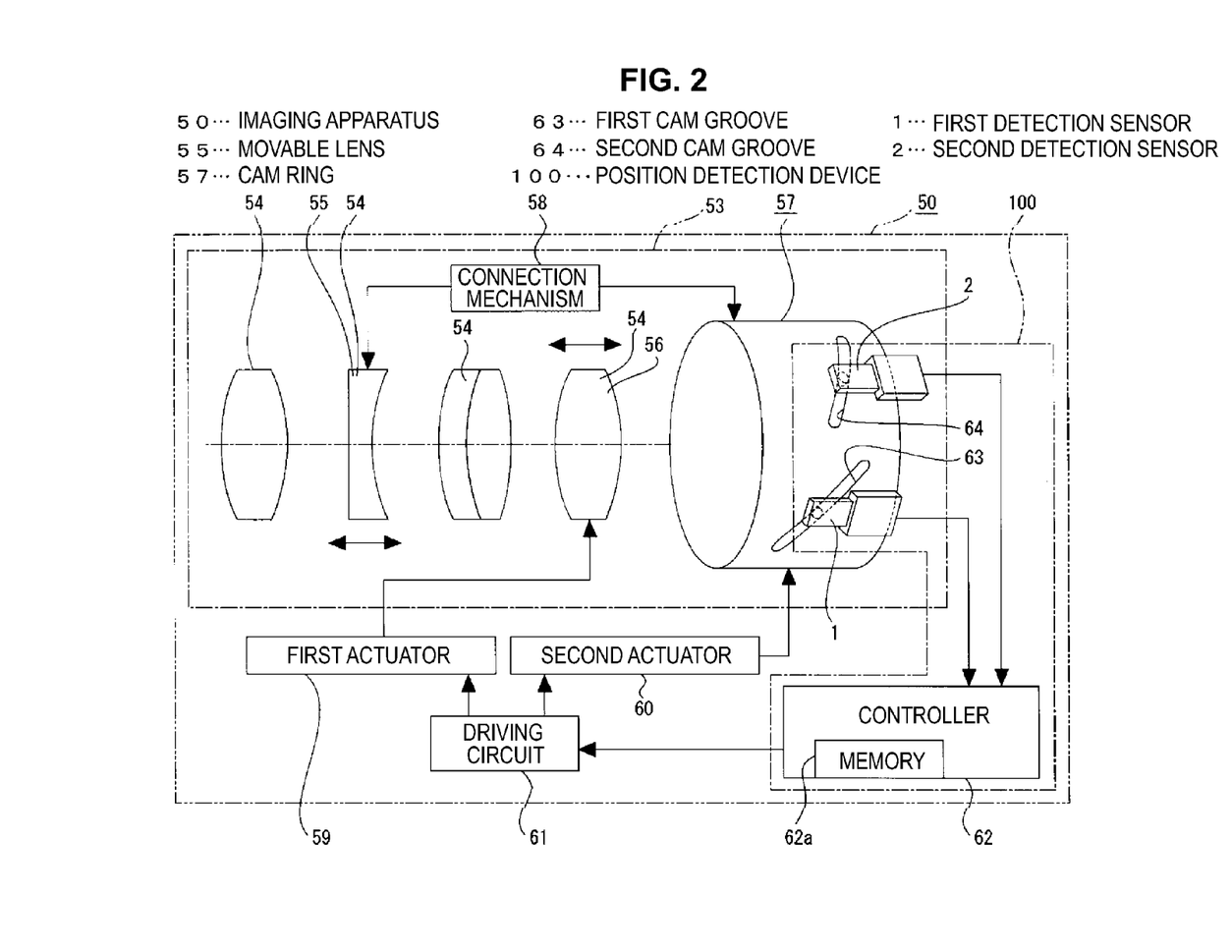
FIG. 2 is a schematic diagram illustrating an internal configuration of the imaging apparatus.

An imaging apparatus 50 includes necessary units inside and outside an outer casing 51 (see FIGS. 1 and 2). Various operation units 52 are installed on the outer surface of the outer casing 51. A power button, a shutter, a zoom switch, a mode switch knob, and the like are installed as the operation units 52

The imaging apparatus 50 includes a lens barrel 53. A plurality of lens groups 54 are disposed inside the lens barrel 53. An imaging unit (not shown) including an image sensor is disposed in the rear end of the lens barrel 53.

The lens groups 54 include fixed groups and movable groups. A zoom lens group and a focus lens group are installed as the movable groups. Each lens of the zoom lens group is a movable lens 55 and each lens of the focus lens group is a movable lens 56.

The lens barrel 53 includes a cam ring 57 that can be rotated in an axis rotation direction. The movable lens 55 of the zoom lens group is connected to the cam ring 57 via a connection mechanism 58. For example, the connection mechanism 58 is a lens holding frame that holds the movable lens 55 or a section that holds the lens holding frame.

The movable lens 55 is guided to a rectilinear guide member (not shown) in accordance with a rotation amount and a rotation direction of the cam ring 57 and is moved to each position in an optical axis direction.

The movable lens 56 of the focus lens group is moved in the optical axis direction by a first actuator 59. When the movable lens 56 is moved in the optical axis direction by the first actuator 59, an autofocus function is performed.

The cam ring 57 is rotated by the driving force of a second actuator 60.

The driving of the first actuator 59 and the second actuator 60 is controlled by a driving circuit 61. The driving circuit 61 is controlled by a controller 62. The controller 62 functions as position detection means that detects the position of the movable lens 55 in the optical axis direction and control means that controls each unit of the driving circuit 61 and the like. The controller 62 includes a memory 62a. The memory 62a stores trajectory data or the like indicating the position of the movable lens 56 of the focus lens group holding an image surface with respect to the movement position of the movable lens 55 of the zoom lens group.

When the position of the movable lens 55 of the zoom lens group is detected, the movable lens 56 of the focus lens group is moved in the optical axis direction by the first actuator 59 to correct a variation in the image surface in accordance with the detected position of the movable lens 55, and therefore the function of a compensator is realized.

Figure 3:
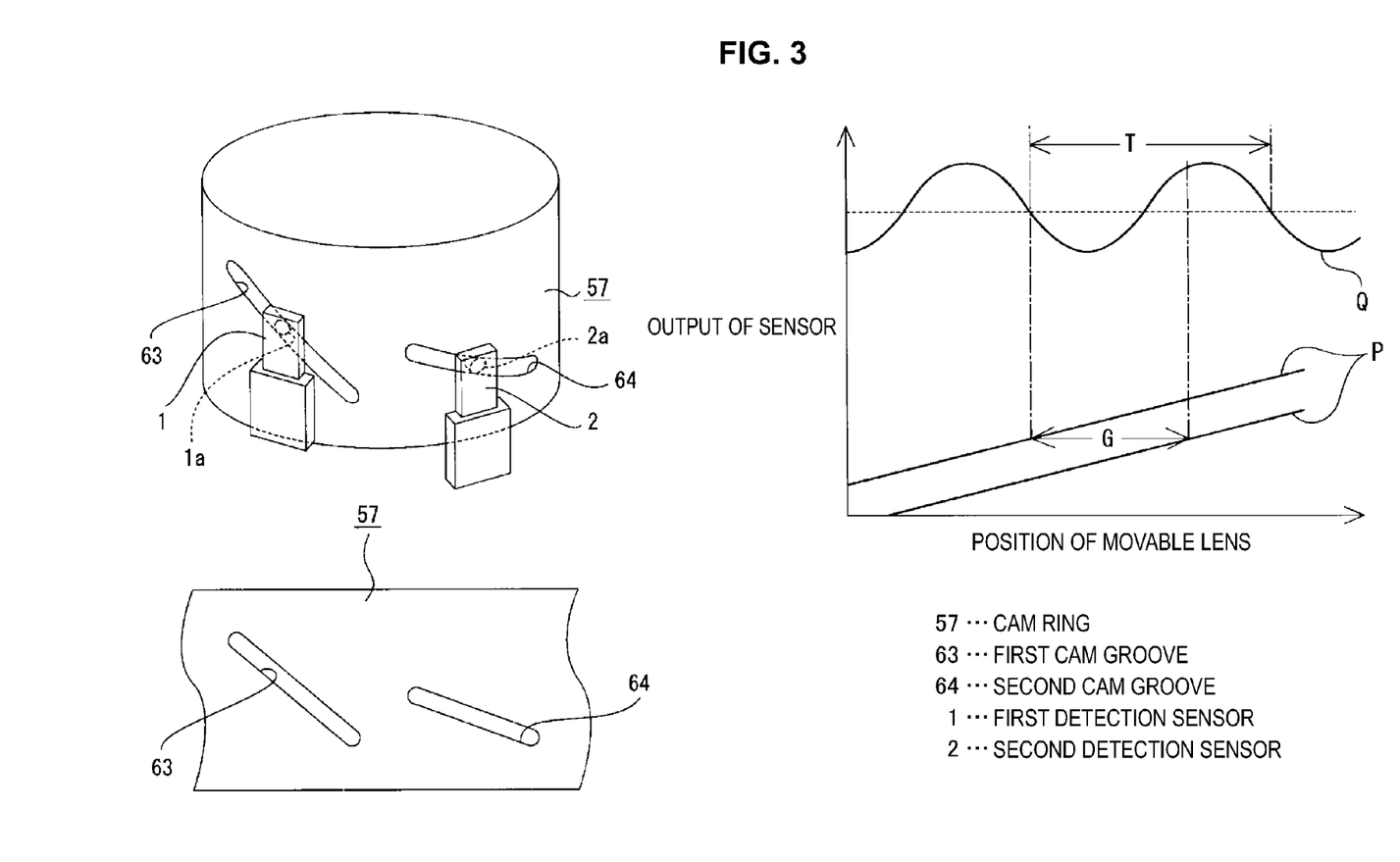
FIG. 3 is a diagram illustrating the configuration of a cam groove of a cam ring and a main relation between first and second detection sensors.

A first cam groove 63 and a second cam groove 64 are formed in the cam ring 57 (see FIGS. 2 and 3). The first cam groove 63 serves as a first cam portion and the second cam groove 64 serves as a second cam portion. The first cam groove 63 and the second cam groove 64 are formed in, for example, a straight line shape and are inclined with respect to the optical axis direction. The inclination angle of the second cam groove 64 with respect to the optical axis direction is configured to be greater than the inclination angle of the first cam groove 63 with respect to the optical axis direction.

A first detection sensor 1 and a second detection sensor 2 are slidably held in the first cam groove 63 and the second cam groove 64 of the cam ring 57, respectively. The first detection sensor 1 and the second detection sensor 2 form a position detection device 100 together with the controller 62 functioning as the position detection means.

The first detection sensor 1 is a sensor that outputs a continuously increasing or decreasing signal and detects the absolute position of the movable lens 55 moved in the optical axis direction. For example, a potentiometer is used as the first detection sensor 1.

The second detection sensor 2 is a sensor that outputs a periodically and continuously changing signal and detects a relative position of the movable lens 55. For example, an MR sensor is used as the second detection sensor 2. The second detection sensor 2 is configured to detect the position of the movable lens 55 with higher accuracy than the first detection sensor 1.

An engagement protrusion portion 1a is formed in the first detection sensor 1. The engagement protrusion portion 1a slidably engages with the first cam groove 63. The first detection sensor 1 is movably held in the front and rear directions by a rectilinear guide (not shown). Therefore, when the engagement position of the engagement protrusion portion 1a with respect to the first cam groove 63 is changed in response to the rotation of the cam ring 57, the first detection sensor 1 is guided by the rectilinear guide to be moved in the front and rear direction. The first detection sensor 1 is moved in the front and rear directions simultaneously with the movement of the movable lens 55 that is moved in the front and rear direction (the optical axis direction) in response to the rotation of the cam ring 57.

An engagement protrusion portion 2a is formed in the second detection sensor 2. The engagement protrusion portion 2a slidably engages with the second cam groove 64. The second detection sensor 2 is movably held in the front and rear directions by a rectilinear guide (not shown). Therefore, when the engagement position of the engagement protrusion portion 2a with respect to the second cam groove 64 is changed in response to the rotation of the cam ring 57, the second detection sensor 2 is guided by the rectilinear guide to be moved in the front and rear direction. The second detection sensor 2 is moved in the front and rear directions simultaneously with the movement of the first detection sensor 1 and the movable lens 55 that is moved in the front and rear direction (the optical axis direction) in response to the rotation of the cam ring 57.

As described above, the inclination angle of the second cam groove 64 with respect to the optical axis direction is configured to be greater than the inclination angle of the first cam groove 63 with respect to the optical axis direction. Therefore, when the cam ring 57 is rotated, the operation speed of the second detection sensor 2 is slower than the operation speed of the first detection sensor 1. Further, when the cam ring 57 is rotated, the movement distance of the second detection sensor 2 is less than the movement distance of the first detection sensor 1.

When the cam ring 57 is rotated, the movable lens 55 is moved in the optical axis direction and the first detection sensor 1 and the second detection sensor 2 are also moved in the front and rear direction (the optical axis direction). Then, the first detection sensor 1 and the second detection sensor 2 detect the position of the movable lens 55 in the optical axis direction.

The position of the movable lens 55 is detected based on a detection signal detected using a linear (straight-line-shaped) output P output by the first detection sensor 1 and a periodic output Q output by the second detection sensor 2 (see FIG. 3).

The first detection sensor 1 detects the absolute position of the movable lens 55 based on the linear output P and transmits the detection signal to the controller 62. The first detection sensor 1 is a sensor that has lower detection accuracy than the second detection sensor 2, as described above, and has a given detection error G, as indicated by two parallel output lines in FIG. 3. That is, the position of the movable lens 55 in the optical axis direction detected by the first detection sensor 1 is a detection position at which there is the detection error G.

On the other hand, the second detection sensor 2 detects a relative position of the movable lens 55, for example, a movement position with respect to the immediately previous position before the movement, based on the periodic output Q and transmits the detection signal to the controller 62. The second detection sensor 2 is a sensor that has higher detection accuracy than the first detection sensor 1, as described above. Since the operation speed of the second detection sensor 2 is slower than the operation speed of the first detection sensor 1, a period T of the periodic output Q is equal to or greater than the detection error G of the first detection sensor 1.

The controller 62 detects the position of the movable lens 55 in the optical axis direction based on the detection signals transmitted from the first detection sensor 1 and the second detection sensor 2.

When the position of the movable lens 55 is detected by the second detection sensor 2, one period T of the periodic output Q is equal to or greater than the detection error G of the first detection sensor 1, as described above. Accordingly, since the periodic output Q of the second detection sensor 2 having the high detection accuracy is configured to be matched by the first detection sensor 1 having the low detection accuracy, the position of the movable lens 55 can be detected with high resolution and high accuracy.

The case in which the cam ring 57 including the first cam groove 63 and the second cam groove 64 with the straight line shape is used as an example of means for moving the first detection sensor 1, the second detection sensor 2, and the movable lens 55 has been described. However, for example, a cam ring 57A to be described below may be used instead of the cam ring 57 (see FIG. 4).

Figure 4:
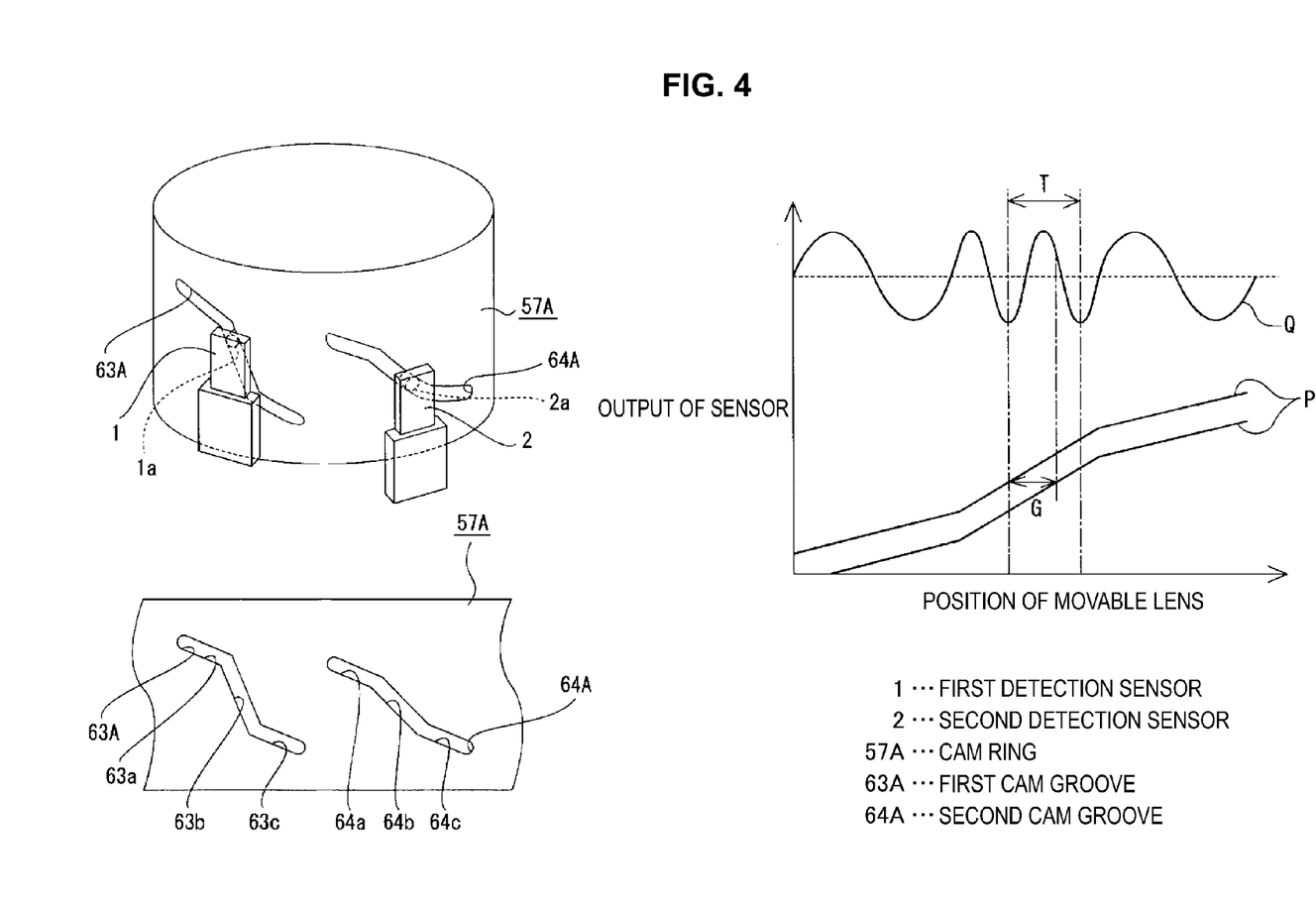
FIG. 4 is a diagram illustrating the configuration of a cam groove of another cam ring in which inclination angles are partially different from one another and an output relation between the first and second detection sensors.

The cam ring 57A includes a first cam groove 63A and a second cam groove 64A. The first detection sensor 1, the second detection sensor 2, and the movable lens 55 are moved in the optical axis direction in response to the rotation of the cam ring 57A.

In the first cam groove 63A, a first cam engagement portion 63a, a second cam engagement portion 63b, and a third cam engagement portion 63c having a straight line shape are continuously formed. The inclination angle of the second cam engagement portion 63b with respect to the optical axis direction is different from the inclination angles of the first cam engagement portion 63a and the third cam engagement portion 63c with respect to the optical axis direction.

In the second cam groove 64A, a first cam engagement portion 64a, a second cam engagement portion 64b, and a third cam engagement portion 64c having a straight line shape are continuously formed. The inclination angle of the second cam engagement portion 64b with respect to the optical axis direction is different from the inclination angles of the first cam engagement portion 64a and the third cam engagement portion 64c with respect to the optical axis direction.

In the first cam groove 63A and the second cam groove 64A, the inclination angles of the first cam engagement portion 63a and the first cam engagement portion 64a with respect to the optical axis direction are the same. The inclination angles of the second cam engagement portion 63b and the second cam engagement portion 64b are different with respect to the optical axis direction. The inclination angles of the third cam engagement portion 63c and the third cam engagement portion 64c are the same with respect to the optical axis direction. The inclination angle of the second cam engagement portion 64b with respect to the optical axis direction is greater than the inclination angle of the second engagement portion 63b with respect to the optical axis direction.

An engagement protrusion portion 1a of the first detection sensor 1 and an engagement protrusion portion 2a of the second detection sensor 2 slidably engage with the first cam groove 63A and the second cam groove 64A, respectively. In the first detection sensor 1 and the second detection sensor 2, the engagement protrusion portion 2a engages with the first cam engagement portion 64a when the engagement protrusion portion 1a engages with the first cam engagement portion 63a. The engagement protrusion portion 2a engages with the second cam engagement portion 64b when the engagement protrusion portion 1a engages with the second cam engagement portion 63b. The engagement protrusion portion 2a engages with the third cam engagement portion 64c when the engagement protrusion portion 1a engages with the third cam engagement portion 63c.

As described above, the inclination angle of the second cam engagement portion 64b of the second cam groove 64A with respect to the optical axis direction is greater than the inclination angle of the second cam engagement portion 63b of the first cam groove 63A with respect to the optical axis direction. When the cam ring 57A is rotated and the engagement protrusion portions 1a and 2a engage with the second cam engagement portions 63b and 64b, respectively, the operation speed of the second detection sensor 2 is slower than the operation speed of the first detection sensor 1.

Accordingly, when the cam ring 57A is rotated and the engagement protrusion portions 1a and 2a engage with the second cam engagement portions 63b and 64b, respectively, one period T of an output Q of the second detection sensor 2 is equal to or greater than a detection error G of the first detection sensor 1.

Thus, the operation speed of the second detection sensor 2 is configured to be slower than the operation speed of the first detection sensor 1 only in a partial operation range of the movable lens 55 in the optical axis direction. Accordingly, since the periodic output Q of the second detection sensor 2 having the high detection accuracy is configured to be matched by the first detection sensor 1 having the low detection accuracy only in the partial operation range, the position of the movable lens 55 can be detected with high resolution and high accuracy in the partial operation range.

In an imaging apparatus including a zoom optical system, position detection accuracy necessary for the zoom lens group (the movable lens) is proportional to sensitivity of the zoom lens group at each power changing position in the operation range of the zoom lens group. Accordingly, when the position of the movable lens 55 is detected with high resolution and high accuracy in the partial operation range, as described above, the position of the movable lens 55 is preferably detected, for example, in a range in which the sensitivity is particularly high in the operation range of the movable lens 55. When a degree of sensitivity, which is the detection accuracy according to the sensitivity, is adjusted, the detection ranges of the first detection sensor 1 and the second detection sensor 2 can be effectively used. Therefore, since the first detection sensor 1 and the second detection sensor 2 can be miniaturized and sensors having low detection accuracy can be used as the first detection sensor 1 and the second detection sensor 2, the imaging apparatus 50 can be miniaturized and manufacturing cost can be reduced.

The case in which the inclination angles of the second cam engagement portions with respect to the optical axis direction are different from each other has been described. However, for example, a first cam groove 63B and a second cam groove 64B may be formed as in a cam ring 57B shown in FIG. 5 so that an inclination angle of a cam engagement portion with respect to the optical axis direction is different only on one side of a telescope side and a wide-angle side in the operation range of the movable lens 55.

Figure 5:
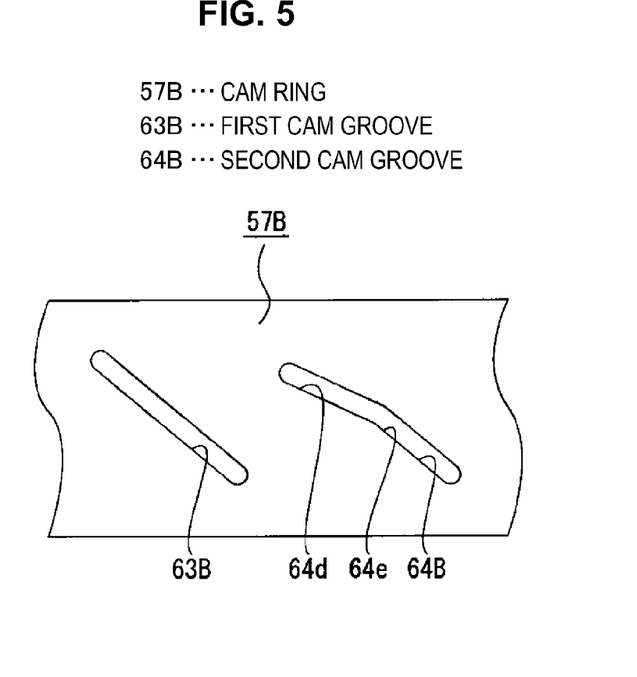
FIG. 5 is a development diagram illustrating the configuration of still another cam ring in which inclination angles are partially different from one another.

In the cam ring 57B, a first cam groove 63B is formed in a straight line shape and the second cam groove 64B includes a first cam engagement portion 64d and a second cam engagement portion 64e inclined at different inclination angles with respect to the optical axis direction. In the second cam groove 64B, the inclination angle of the first engagement portion 64d with respect to the optical axis on the telescope side is greater than the inclination angle of the first cam groove 63B with respect to the optical axis direction. The inclination angle of the first cam engagement portion 64e with respect to the optical axis direction on the wide-angle side is equal to the inclination angle of the first cam groove 63B with respect to the optical axis direction.

Accordingly, when the cam ring 57B is rotated and the movable lens 55 is moved in the optical axis direction, one period T of the output Q of the second detection sensor 2 on the telescope side is equal to or greater than the detection error G of the first detection sensor 1. Thus, the position of the movable lens 55 can be detected with high resolution and high accuracy in the operation range on the telescope side.

Figure 6:
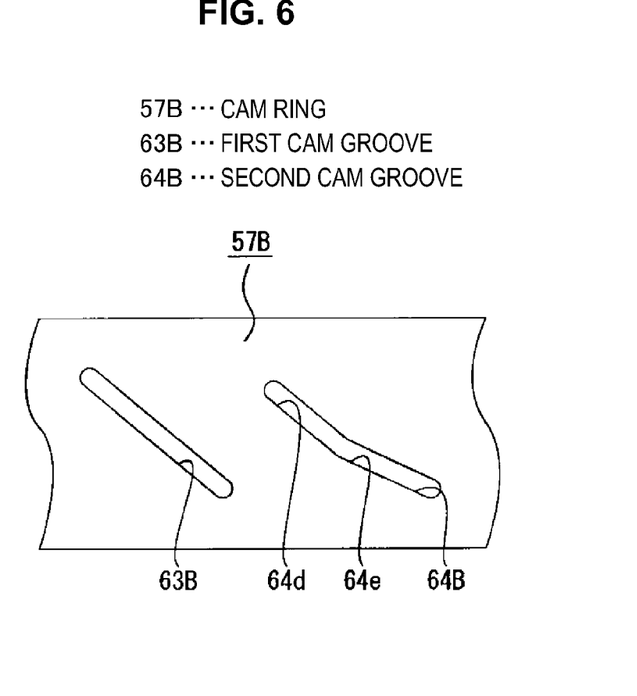
FIG. 6 is a development diagram illustrating the configuration of yet another cam ring in which inclination angles are partially different from one another.

Conversely, as shown in FIG. 6, the inclination angle of a second cam engagement portion 64f of the second cam groove 64B on the wide-angle side is greater than the inclination angle of the first cam groove 63B. Accordingly, the position of the movable lens 55 can be detected with high resolution and high accuracy in the operation range on the wide-angle side.

In the imaging apparatus 50, as described above, the position of the movable lens 55 can be detected by moving the first detection sensor 1 and the second detection sensor 2 in the optical axis direction to operate in a straight line. Accordingly, the position of the movable lens 55 can be detected with high resolution and high accuracy, while simplifying the detection operation and reducing the manufacturing cost.

The position of the movable lens 55 is detected by moving the first detection sensor 1 and the second detection sensor 2 in response to the rotation of the cam ring 57, 57A, or 57B moving the movable lens 55. Accordingly, the first detection sensor 1 and the second detection sensor 2 are moved in the optical axis direction together with the movable lens 55. Thus, the detection operation can be controlled with ease and the position of the movable lens 55 can be detected with high resolution and high accuracy, while reducing the manufacturing cost.

Further, the position of the movable lens 55 is detected by setting the inclination angle of the first cam groove 63, 63A, or 63B with respect to the optical axis direction to be different from the inclination angle of the entirety or a part of the second cam groove 64, 64A, or 64B with respect to the optical axis direction. Therefore, the position of the movable lens 55 can be detected with high resolution and high accuracy, while simplifying the configuration and reducing the manufacturing cost.

Other Examples of Detection Sensor and the Like

Figure 7:
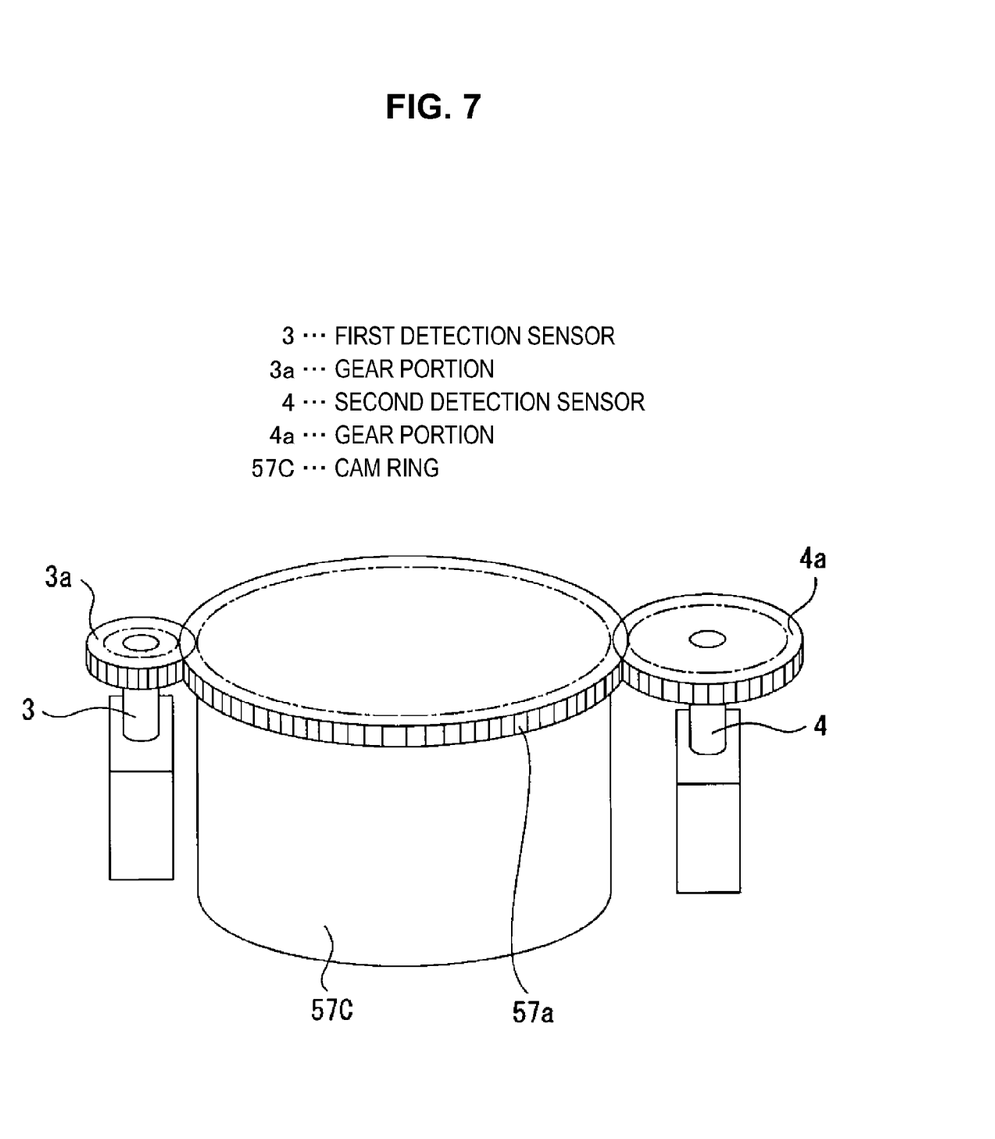
Figure 8:
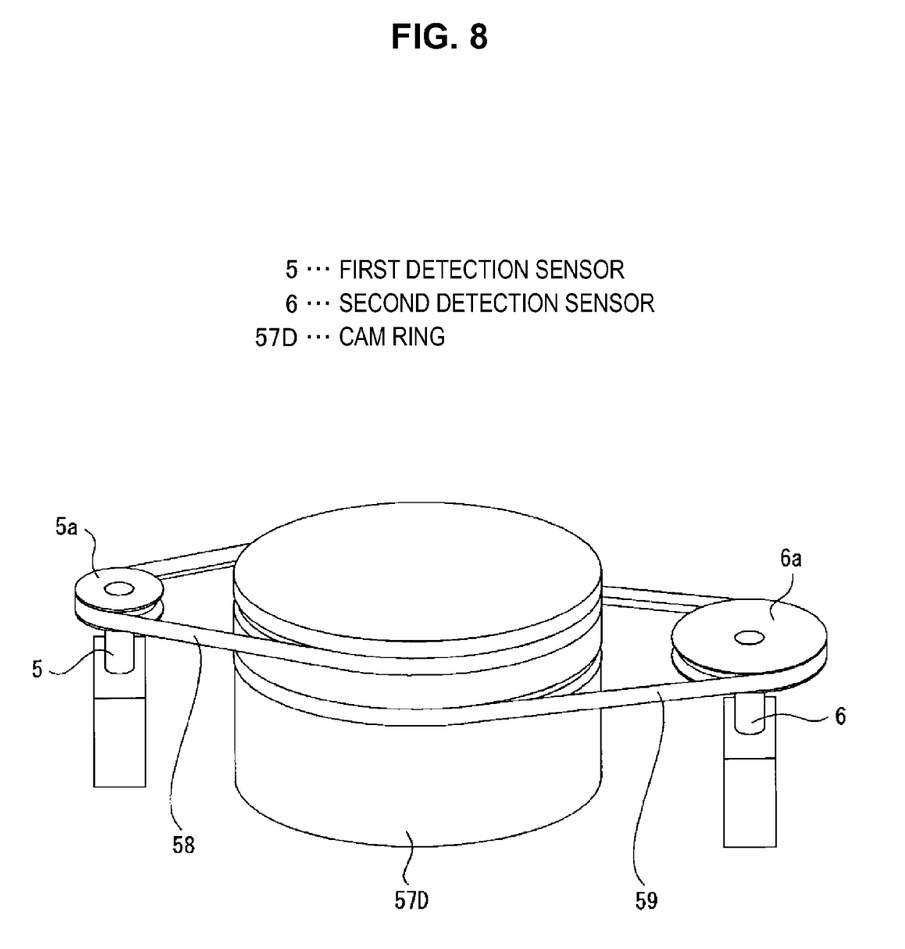

Hereinafter, other examples of detection sensors and the like will be described (see FIGS. 7 and 8).

First, an example of detection sensors and the like including gear portions will be described (see FIG. 7).

A first detection sensor 3 and a second detection sensor 4 are rotation type sensors and include gear portions 3a and 4a, respectively. The outer diameter of the gear portion 4a of the second detection sensor 4 is configured to be greater than the outer diameter of the gear portion 3a of the first detection sensor 3.

The first detection sensor 3 is a sensor that outputs a linear signal when rotated and detects the absolute position of the movable lens 55 moved in the optical axis direction. The second detection sensor 4 is a sensor that outputs a periodically and continuously changing signal and detects a relative position of the movable lens 55. The second detection sensor 4 is configured to detect the position of the movable lens 55 with higher accuracy than the first detection sensor 3.

In the cam ring 57C, a rack portion 57a extending in the circumference direction is formed. The gear portion 3a of the first detection sensor 3 and the gear portion 4a of the second detection sensor 4 mesh with the rack portion 57a. Accordingly, when the cam ring 57C is rotated, the gear portion 3a of the first detection sensor 3 and the gear portion 4a of the second detection sensor 4 are rotated. Then, the position of the movable lens 55 is detected based on a detection signal detected using a linear output P of the first detection sensor 3 and a periodic output Q of the second detection sensor 4.

Here, the outer diameter of the gear portion 4a of the second detection sensor 4 is configured to be greater than the outer diameter of the gear portion 3a of the first detection sensor 3. Therefore, since the angular speed (operation speed) of the gear portion 4a is slower than the angular speed of the gear portion 3a, one period T of the periodic output Q of the second detection sensor 4 is equal to or greater than a detection error G of the first detection sensor 3. Accordingly, since the periodic output Q of the second detection sensor 4 having the high detection accuracy is configured to be matched by the first detection sensor 3 having the low detection accuracy, the position of the movable lens 55 can be detected with high resolution and high accuracy.

Next, an example of detection sensors and the like having pulley portions will be described (see FIG. 8).

A first detection sensor 5 and a second detection sensor 6 are rotation type sensors and include pulley portions 5a and 6a, respectively. The outer diameter of the pulley portion 6a of the second detection sensor 6 is configured to be greater than the outer diameter of the pulley portion 5a of the first detection sensor 5.

The first detection sensor 5 is a sensor that outputs a linear signal when rotated and detects the absolute position of the movable lens 55 moved in the optical axis direction. The second detection sensor 6 is a sensor that outputs a periodically and continuously changing signal and detects a relative position of the movable lens 55. The second detection sensor 6 is configured to detect the position of the movable lens 55 with higher accuracy than the first detection sensor 5.

The cam ring 57D is wound with belts 58 and 59 between the pulley portions 5a and 6a and the cam ring 57D, respectively. Accordingly, when the cam ring 57D is rotated, the pulley portion 5a of the first detection sensor 5 and the pulley portion 6a of the second detection sensor 6 are rotated by the belts 58 and 59, respectively. Then, the position of the movable lens 55 is detected based on a detection signal detected using a linear output P of the first detection sensor 5 and a periodic output Q of the second detection sensor 6.

Here, the outer diameter of the pulley portion 6a of the second detection sensor 6 is configured to be greater than the outer diameter of the pulley portion 5a of the first detection sensor 5. Therefore, since the angular speed (operation speed) of the pulley portion 6a is slower than the angular speed of the pulley portion 5a, one period T of the periodic output Q of the second detection sensor 6 is equal to or greater than a detection error G of the first detection sensor 5. Accordingly, since the periodic output Q of the second detection sensor 6 having the high detection accuracy is configured to be matched by the first detection sensor 5 having the low detection accuracy, the position of the movable lens 55 can be detected with high resolution and high accuracy.

As described above, in the other examples of the detection sensors, the position of the movable lens 55 is detected by rotating the first detection sensors 3 and 5 and the second detection sensors 4 and 6. Therefore, the position of the movable lens 55 can be detected with high resolution and high accuracy, while simplifying the detection operation and reducing the manufacturing cost.

Further, the position of the movable lens 55 is detected by moving the first detection sensors 3 and 5 and the second detection sensors 4 and 6 in response to the rotation of the cam rings 57C and 57D moving the movable lens 55, respectively. Accordingly, since the first detection sensors 3 and 5 and the second detection sensors 4 and 6 are rotated with the movement of the movable lens 55 in the optical axis direction, the position of the movable lens 55 can be detected with high resolution and high accuracy, while controlling the detection operation with ease and reducing the manufacturing cost.

Further, the position of the movable lens 55 is detected by setting the sizes of the outer diameters of the gear portions 3a and 4a or the sizes of the outer diameters of the pulley portions 5a and 6a to be different from each other. Accordingly, the position of the movable lens 55 can be detected with high resolution and high accuracy, while simplifying the configuration of the position detection device 100 and reducing the manufacturing cost.

Another Example of Imaging Apparatus

Figure 9:
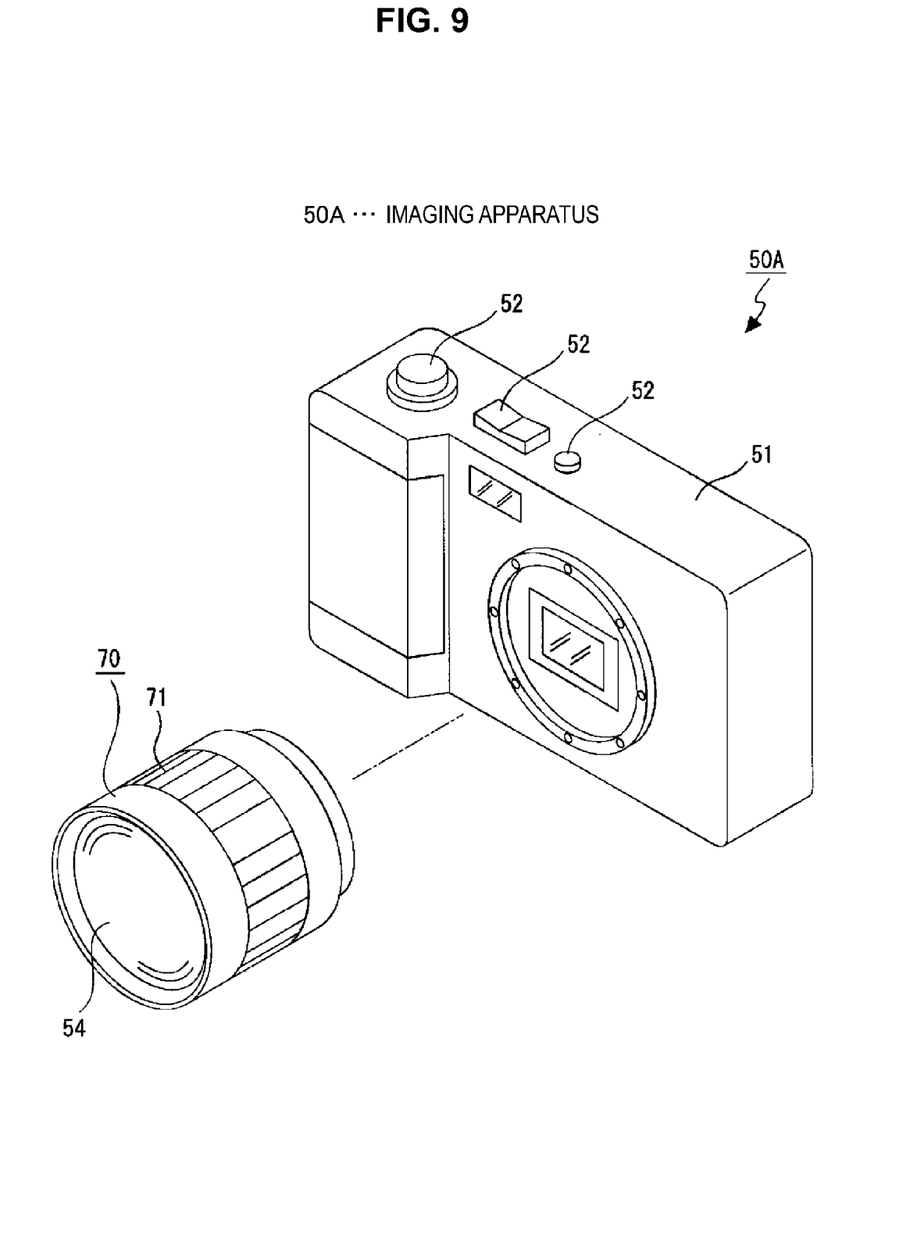
FIG. 9 is a schematic perspective view illustrating an imaging apparatus including an interchangeable lens that is detachably mounted.

The case in which the imaging apparatus 50 has the lens barrel 53 therein has been described. However, for example, the embodiment of the present technology is applicable to an imaging apparatus 50A that includes an interchangeable lens 70, as shown in FIG. 9.

The interchangeable lens 70 has a plurality of lens groups (not shown) therein. The plurality of lens groups include a zoom lens group and a focus lens group as movable groups. Each lens of the zoom lens group is a movable lens 55 and each lens of the focus lens group is a movable lens 56.

A zoom ring 71 that is manually operated is rotatably held on the outer circumference of the interchangeable lens 70. When the zoom ring 71 is rotated, the first detection sensor 1 and the second detection sensor of the movable lens 55 are moved in the optical axis direction.

Summarization

In the imaging apparatuses 50 and 50A, as described above, the position of the movable lens 55 is detected by operating the first detection sensors 1, 3, and 5 and the second detection sensors 2, 4, and 6 at different operation speeds.

Accordingly, it is not necessary to enlarge the magnetization pitch of the second detection sensor or use a detection sensor with a small linearity error or small hysteresis as the first detection sensor. Further, the position of the movable lens can be detected with high resolution and high accuracy, while achieving miniaturization and reducing manufacturing cost.

The operation speeds of the first detection sensors 1, 3, and 5 and the second detection sensors 2, 4, and 6 can be arbitrarily made to be different from each other. Further, the detection accuracy can be freely changed. Therefore, sensitivity can be adjusted in accordance with necessary detection accuracy.

The first detection sensors 1, 3, and 5 and the second detection sensors 2, 4, and 6 can operate in the range of necessary and sufficient detection accuracy. Therefore, since a space can be used efficiently by restricting the operation range within a necessary range, the imaging apparatus 50 and 50A can be miniaturized.

One period of each output signal of the second detection sensors 2, 4, and 6 of the imaging apparatuses 50 and 50A is set to be equal to or greater than each detection error of the first detection sensors 1, 3, and 5.

Accordingly, since each periodic output Q of the second detection sensors 2, 4, and 6 having the high detection accuracy is configured to be matched by each of the first detection sensors 1, 3, and 5 having the low detection accuracy, the position of the movable lens 55 can be detected with high resolution and high accuracy.

Others

The case in which the position of the movable lens 55 of the zoom lens group is detected has been described. However, the position detection device 100 is not limited to a device that detects the position of the movable lens 55 of the zoom lens group, but is applicable to an imaging apparatus that detects the position of another movable lens or a moving optical member.

Present Technology

The present technology may also be configured as follows.

(1) A position detection device including:

a first detection sensor that operates in a predetermined direction, outputs a continuously increasing or decreasing signal, and detects an absolute position of a movable lens moved in an optical axis direction; and a second detection sensor that operates in the predetermined direction, outputs a periodically and continuously changing signal, and detects a relative position of the movable lens, wherein the first detection sensor and the second detection sensor operate at different operation speeds.

(2) The position detection device according to (1), wherein one period of an output signal of the second detection sensor is equal to or greater than a detection error of the first detection sensor.

(3) The position detection device according to (1) or (2), wherein a range in which the operation speeds of the first and second detection sensors are different from each other is set to be a part of each operation range of the first and second detection sensors.

(4) The position detection device according to any of (1) to (3), wherein the first and second detection sensors operate in a straight line.

(5) The position detection device according to any of (1) to (4), further including:

a cam ring that includes first and second cam portions and rotates in an axis rotation direction, wherein the first detection sensor slidably engages with the first cam portion,
the second detection sensor slidably engages with the second cam portion,
the movable lens is moved in the optical axis direction in response to the rotation of the cam ring, and
when an engagement position of the first detection sensor with respect to the first cam portion is changed and an engagement position of the second detection sensor with respect to the second cam portion is changed depending on a rotation position of the cam ring, the first and second detection sensors operate in the straight line.
(6) The position detection device according to (5), wherein the operation speeds of the first and second detection sensors are configured to be different from each other by setting inclinations of the first and second cam portions to be different from each other.
(7) The position detection device according to any of (1) to (6), wherein the first and second detection sensors are configured to operate rotatably.
(8) The position detection device according to (7), further including:
a cam ring that includes a rack portion on an outer circumferential surface thereof and rotates in an axis rotation direction,
wherein the first detection sensor includes a gear portion meshing with the rack portion,
the second detection sensor includes a gear portion meshing with the rack portion and having an outer diameter different from an outer diameter of the gear portion of the first detection sensor,
the movable lens is moved in the optical axis direction in response to the rotation of the cam ring, and
the gear portions of the first and second detection sensors are rotated when the cam ring rotates.
(9) The position detection device according to (8), wherein sizes of the outer diameters of the gear portions of the first and second detection sensors are configured to be different from each other so that the operation speeds of the first and second detection sensors are different from each other.
(10) A position detection method including:
operating a first detection sensor, which operates in a predetermined direction and outputs a continuously increasing or decreasing signal, and a second detection sensor, which operates in the predetermined direction and outputs a periodically and continuously changing signal, at different operation speeds;
detecting an absolute position of a movable lens moved in an optical axis direction by the first detection sensor and detecting a relative position of the movable lens by the second detection sensor; and
detecting a position of the movable lens based on the absolute position of the movable lens detected by the first detection sensor and the relative position of the movable lens detected by the second detection sensor.
(11) An imaging apparatus including:
a movable lens that is moved in an optical axis direction;
an image sensor that converts an optical image formed by a plurality of lenses including the movable lens into an electric signal;
a first detection sensor that operates in a predetermined direction, outputs a continuously increasing or decreasing signal, and outputs an absolute position of the movable lens; and
a second detection sensor that operates in the predetermined direction, outputs a periodically and continuously changing signal, and detects a relative position of the movable lens,
wherein the first and second detection sensors operate at different operation speeds.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-180876 filed in the Japan Patent Office on Aug. 22, 2011, the entire content of which is hereby incorporated by reference.

What is claimed is:

1. A position detection device comprising:
a first detection sensor configured to, when a movable lens is moved in an optical axis direction, operate in a predetermined direction at a first operation speed, output a continuously increasing or decreasing signal, and detect an absolute position of the movable lens; and
a second detection sensor configured to, when the movable lens is moved in the optical axis direction, operate in the predetermined direction at a second operation speed, output a periodically and continuously changing signal, and detect a relative position of the movable lens,
wherein the first detection sensor and the second detection sensor are configured such that the first and second operation speeds are different from each other at least within the given range of movement of the movable lens.

2. The position detection device according to claim 1, wherein the first and second detection sensors are configured such that, when the movable lens is moved in the optical axis direction, one period of an output signal of the second detection sensor is equal to or greater than a detection error of the first detection sensor.

3. The position detection device according to claim 1, wherein the given range of movement of the movable lens is a partial portion of a total range of movement of the moveable lens.

4. The position detection device according to claim 3, wherein in portions of the total range of movement of the moveable lens other than the given range of movement, the first and second operation speeds are the same.

5. The position detection device according to claim 1, wherein the predetermined direction is a straight line.

6. The position detection device according to claim 5, further comprising:
a cam ring that includes first and second cam portions and rotates in an axis rotation direction,
wherein the first detection sensor slidably engages with the first cam portion,
the second detection sensor slidably engages with the second cam portion,
the movable lens is moved in the optical axis direction in response to the rotation of the cam ring, and
when the cam ring is rotated, an engagement position of the first detection sensor with respect to the first cam portion is changed and an engagement position of the second detection sensor with respect to the second cam portion is changed depending on a rotation position of the cam ring, the changing of the respective engagement positions of the first and second detection sensors causing the first and second detection sensors to operate in the straight line.

7. The position detection device according to claim 6, wherein inclinations of at least respective parts of the first and second cam portions are different from each other such that the first and second operation speeds are different from each other at least within the given range of movement of the movable lens.

8. The position detection device according to claim 6, wherein
wherein the given range of movement of the movable lens is a partial portion of a total range of movement of the moveable lens, and
the first and second cam portions each include:
a first sub-portion that corresponds to the given movement range, and
at least one second sub-portion, each corresponding to a portion of the total range of movement of the moveable lens other than the given movement range,
wherein, when the respective engagement positions of the first and second detection sensors are within the respective first sub-portions of the first and second cam portions, the first and second operation speeds are different from each other, and
when the respective engagement positions of the first and second detection sensors are within any of the respective second sub-portions of the first and second cam portions, the first and second operation speeds are the same.

9. The position detection device according to claim 1, wherein the predetermined direction is a circumferential direction, the first and second detection sensors being configured to operate rotatably.

10. The position detection device according to claim 9, further comprising:
a cam ring that includes a rack portion on an outer circumferential surface thereof and rotates in an axis rotation direction,
wherein the first detection sensor includes a gear portion meshing with the rack portion,
the second detection sensor includes a gear portion meshing with the rack portion and having an outer diameter different from an outer diameter of the gear portion of the first detection sensor,
the movable lens is moved in the optical axis direction in response to the rotation of the cam ring, and
the gear portions of the first and second detection sensors are rotated when the cam ring rotates.

11. The position detection device according to claim 10, wherein sizes of the outer diameters of the gear portions of the first and second detection sensors are configured to be different from each other so that the operation speeds of the first and second detection sensors are different from each other.

12. A position detection method comprising:
operating a first detection sensor, which operates in a predetermined direction at a first operation speed in response to a movable lens moving in an optical axis direction, the first detection sensor, outputting a continuously increasing or decreasing signal, and
operating a second detection sensor, which operates in the predetermined direction at a second operation speed in response to the movable lens moving in an optical axis direction, the second detection sensor outputting a periodically and continuously changing signal;
detecting an absolute position of the movable lens by the first detection sensor and detecting a relative position of the movable lens by the second detection sensor; and
determining a position of the movable lens based on the absolute position of the movable lens detected by the first detection sensor and the relative position of the movable lens detected by the second detection sensor,
wherein the first and second operation speeds are different from one another.

13. An imaging apparatus comprising:
a movable lens that is movable in an optical axis direction;
an image sensor that converts an optical image formed by a plurality of lenses including the movable lens into an electric signal;
a first detection sensor configured to, when the movable lens is moved in the optical axis direction, operate in a predetermined direction at a first operation speed, output a continuously increasing or decreasing signal, and detect an absolute position of the movable lens; and
a second detection sensor configured to, when the movable lens is moved in the optical axis direction, operate in the predetermined direction at a second operation speed, output a periodically and continuously changing signal, and detect a relative position of the movable lens,
wherein the first detection sensor and the second detection sensor are configured such that the first and second operation speeds are different from each other at least within a given range of movement of the movable lens.

14. An imaging apparatus comprising:
a ring that is rotatable;
a plurality of lenses, including a given lens that is configured to move in an optical axis direction in response to the ring's rotation;
an image sensor configured to convert an optical image formed by the plurality of lenses into an electric signal;
a first detection sensor having a first engagement member configured to move in a first predetermined direction in response to the ring's rotation, the first detection sensor being configured to detect a position of the first engagement member and to output a signal based on the position of the first engagement member;
a second detection sensor having a second engagement member configured to move in a second predetermined direction in response to the ring's rotation, the second detection sensor being configured to detect a position of the second engagement member and to output a signal based on the position of the second engagement member; and
a control unit configured to determine a position of the given lens based on the signals of the first and second detection sensors,
wherein the first and second detection sensors are configured such that, as the ring is rotated from a first position to a second position:
the signal of the first detection sensor continuously increases,
the signal of the second detection sensor continuously and periodically changes, and
an amount of movement of the first engagement member in the first predetermined direction is different from an amount of movement of the second engagement member in the second predetermined direction.

15. The imaging apparatus of claim 14, wherein the first and second predetermined directions are the same direction.

16. The imaging apparatus of claim 15, wherein the first and second predetermined directions are circumferential directions, the respective movements of the first and second engagement members being rotations.

17. The imaging apparatus of claim 16,
wherein the ring includes a rack portion and the first and second engagement members include respective gear portion meshing with the rack portion of the ring,
respective outer diameters of the gear portions of the first and second engagement members are different from one another.

18. The imaging apparatus of claim 15,
wherein the first and second predetermined directions are straight lines, the respective movements of the first and second engagement members being linear translations.

19. The imaging apparatus of claim 18,
wherein the ring includes a first cam and a second cam that slidably engage the first and second engagement members, respectively.

20. The imaging apparatus of claim 19,
wherein the first and second cams are configured such that, as the ring is rotated from a third position to a fourth position an amount of movement of the first engagement member in the first predetermined direction is the same as an amount of movement of the second engagement member in the second predetermined direction.

* * * * *